US010957000B2

(12) United States Patent
Chen et al.

(10) Patent No.: US 10,957,000 B2
(45) Date of Patent: Mar. 23, 2021

(54) ITEM PICKING METHOD AND APPARATUS

(71) Applicant: CAINIAO SMART LOGISTICS HOLDING LIMITED, Grand Cayman (KY)

(72) Inventors: Haibing Chen, Hangzhou (CN); Yuhsuan Chou, Hangzhou (CN); Chengjian Wang, Hangzhou (CN); Lijun Zhu, Hangzhou (CN); Ruipeng Luan, Hangzhou (CN); Heng Liu, Hangzhou (CN); Kailiang Tong, Hangzhou (CN)

(73) Assignee: Cainiao Smart Logistics Holding Limited, Grand Cayman (KY)

( * ) Notice: Subject to any disclaimer, the term of this patent is extended or adjusted under 35 U.S.C. 154(b) by 471 days.

(21) Appl. No.: 15/878,159

(22) Filed: Jan. 23, 2018

(65) Prior Publication Data

US 2018/0211347 A1  Jul. 26, 2018

(30) Foreign Application Priority Data

Jan. 26, 2017 (CN) .......................... 201710061534.9

(51) Int. Cl.
*G06Q 50/28* (2012.01)
*G06Q 10/06* (2012.01)
(Continued)

(52) U.S. Cl.
CPC ......... *G06Q 50/28* (2013.01); *G01C 21/3469* (2013.01); *G05D 1/0011* (2013.01);
(Continued)

(58) Field of Classification Search
CPC ................ G06Q 50/28; G06Q 10/087; G06Q 10/06316; G05D 1/0297; G05D 1/0212;
(Continued)

(56) References Cited

U.S. PATENT DOCUMENTS 5,363,310 A  11/1994  Haj-Ali-Ahmadi et al.
6,289,260 B1  9/2001  Bradley et al.
(Continued)

FOREIGN PATENT DOCUMENTS

CN  106228302 A  12/2016
JP  2009-012923 A  1/2009
(Continued)

OTHER PUBLICATIONS

Examination Report No. 1 dated Feb. 27, 2020, issued in related Australian Application No. 2018212559 (3 pages).
(Continued)

*Primary Examiner* — Thomas G Black
*Assistant Examiner* — Ana D Thomas
(74) *Attorney, Agent, or Firm* — Sheppard Mullin Richter & Hampton LLP

(57) ABSTRACT

The present disclosure provides an item picking method, so that an item stored in a warehouse can be picked and placed in a picking vehicle. Specifically, the warehouse may be divided into one or more picking areas. A picking management device may divide a picking task for items into different picking sub-tasks according to picking areas in which the items are located. One picking vehicle corresponds to several picking sub-tasks. The picking management device allocates an automated guided vehicle (AGV) for a picking sub-task, causing the AGV to move the picking vehicle to a picking area corresponding to the picking sub-task. The picking management device may send task information of the picking sub-task to a picking device corresponding to the picking area. The picking device executes the picking sub-task according to the task information, so as to pick an item and place the item in the picking vehicle, thereby implementing the automation of an item picking process. In addition, the present disclosure
(Continued)

further provides a device related to item picking, so as to ensure the actual application and implementation of the foregoing method.

24 Claims, 9 Drawing Sheets

(51) Int. Cl.
*G06Q 10/08* (2012.01)
*G05D 1/02* (2020.01)
*G05D 1/00* (2006.01)
*G01C 21/34* (2006.01)

(52) U.S. Cl.
CPC ......... *G05D 1/0212* (2013.01); *G05D 1/0217* (2013.01); *G05D 1/0297* (2013.01); *G06Q 10/06316* (2013.01); *G06Q 10/087* (2013.01); *G05D 2201/0216* (2013.01)

(58) Field of Classification Search
CPC ............... G05D 1/0011; G05D 1/0217; G05D 2201/0216; G01C 21/3469; B65G 43/00
See application file for complete search history.

(56) References Cited

U.S. PATENT DOCUMENTS

| | | | |
|---|---|---|---|
| 7,693,757 | B2 | 4/2010 | Zimmerman |
| 7,894,933 | B2 | 2/2011 | Mountz et al. |
| 8,571,700 | B2 | 10/2013 | Keller et al. |
| 8,639,382 | B1 | 1/2014 | Clark et al. |
| 9,785,911 | B2 | 10/2017 | Galluzzo et al. |
| 9,809,384 | B2 | 11/2017 | Mountz et al. |
| 2004/0249497 | A1 | 12/2004 | Saigh et al. |
| 2009/0074545 | A1 | 3/2009 | Lert et al. |
| 2012/0029683 | A1* | 2/2012 | Keller ................ B25J 9/1687 700/214 |
| 2012/0101627 | A1 | 4/2012 | Lert |
| 2012/0143427 | A1 | 6/2012 | Hoffman et al. |
| 2012/0330458 | A1 | 12/2012 | Weiss |
| 2013/0312371 | A1 | 11/2013 | Ambrose |
| 2013/0317642 | A1 | 11/2013 | Asaria et al. |
| 2013/0338819 | A1 | 12/2013 | Winkler |
| 2014/0288696 | A1 | 9/2014 | Lert |
| 2015/0307278 | A1 | 10/2015 | Wickham et al. |
| 2016/0063429 | A1 | 3/2016 | Varley et al. |
| 2016/0176638 | A1 | 6/2016 | Toebes |
| 2017/0046654 | A1 | 2/2017 | Evers et al. |
| 2017/0336780 | A1* | 11/2017 | Wise .................... G05B 19/418 |

FOREIGN PATENT DOCUMENTS

| | | |
|---|---|---|
| JP | 2015-506324 A | 3/2015 |
| JP | 2015-535787 A | 12/2015 |
| JP | 2016-533579 A | 10/2016 |
| WO | 2013/053747 A1 | 4/2013 |
| WO | 2015/020974 A2 | 2/2015 |
| WO | 2016/061255 A1 | 4/2016 |
| WO | 2016/130338 A1 | 8/2016 |
| WO | 2016/130849 A1 | 8/2016 |
| WO | 2016/147335 A1 | 9/2016 |
| WO | 2017/027896 A1 | 2/2017 |
| WO | 2017/100287 A1 | 6/2017 |

OTHER PUBLICATIONS

PCT International Preliminary Report on Patentability dated Aug. 8, 2019, issued in related International Application No. PCT/US2018/014889 (15 pages).

First Search dated Jul. 3, 2019, issued in related Chinese Patent Application No. 2017100615349 (2 pages).

First Office Action dated Jul. 11, 2019, issued in related Chinese Patent Application No. 2017100615349, with English machine translation (27 pages).

International Search Report and Written Opinion for Application No. PCT/US2018/014889, dated Mar. 26, 2018, 16 pages.

Notice of Reasons for Rejection dated Nov. 17, 2020, issued in related Japanese Application No. 2019-540354, with English machine translation (13 pages).

\* cited by examiner

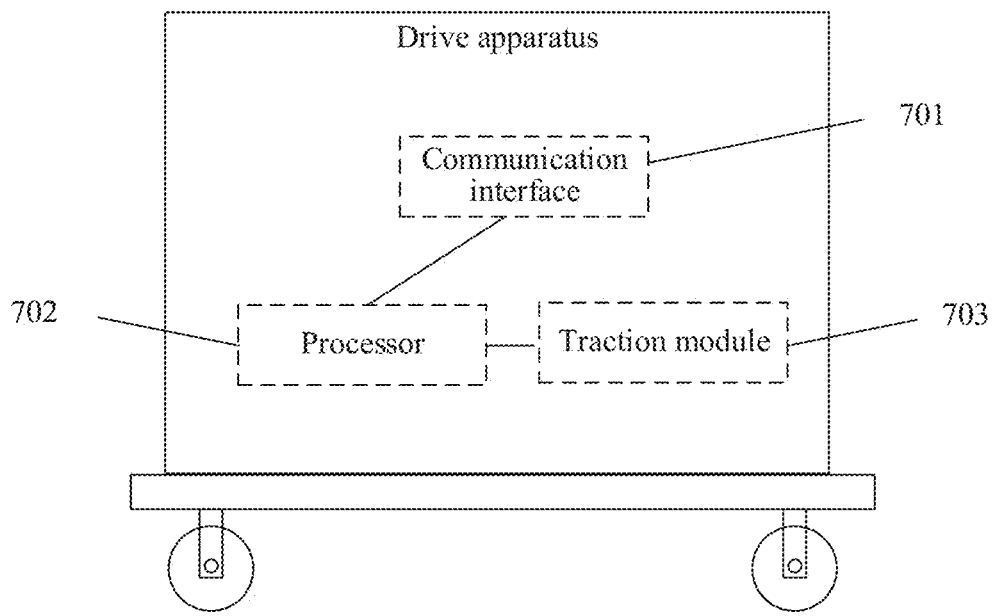

FIGURE 7A

Method 710:

S711: receiving movement data sent by a picking management device, wherein the movement data comprises a start point position and an end point position, the start point position represents a position of an item carrying apparatus, and the end point position represents a position of a picking area corresponding to a picking task associated with the item carrying apparatus S712: Moving the item carrying apparatus according to the movement data to the picking area

FIGURE 7B

Method 810:

S811: Receiving a picking task sent by a picking management device

S812: Receiving a task obtaining request from a picking device in a picking area corresponding to the picking task S813: Sending the picking task to the picking device

ITEM PICKING METHOD AND APPARATUS

CROSS REFERENCE TO RELATED APPLICATIONS

The present application is based on and claims priority to the Chinese Application No. 201710061534.9, filed Jan. 26, 2017, the entire contents of which are incorporated herein by reference.

TECHNICAL FIELD

The present disclosure relates to the technical field of item management, and in particular, to item picking methods and devices.

BACKGROUND

For the ease of management, items (e.g., goods) may be stored in a storage space such as a warehouse. An item storage apparatus may be disposed in the storage space. A storage unit can be disposed on the item storage apparatus. The storage unit can be configured to store items. The item storage apparatus disposed in the warehouse is an inventory shelf. The inventory shelf includes multiple storage bins. The storage bins are configured to store items.

An item in the storage space may need to be picked from the storage unit. Generally, the storage space has a relatively large area and stores a relatively large quantity of items. To improve item picking efficiency, an item picking method needs to be provided, to achieve automated item picking.

SUMMARY

The present disclosure provides an item picking method, for implementing the automation of item picking. According to one aspect, an item picking method, implementable by a picking management device, may comprise: obtaining an item carrying apparatus corresponding to one or more picking tasks; and for each of the one or more picking tasks: determining a corresponding drive apparatus, and sending, to the drive apparatus, movement data generated according to the each picking task, causing the drive apparatus to move the item carrying apparatus to a picking area corresponding to the picking task; and sending the each picking task to a picking device corresponding to the picking area, causing the picking device to complete the picking task in the picking area.

In some embodiments, determining the corresponding drive apparatus for each of the one or more picking tasks may comprise: determining an arrangement order of the one or more picking tasks; and determining the corresponding drive apparatus for the each of the one or more picking tasks based on the arrangement order.

According to another aspect, an item picking method, implementable by a picking management device, may comprise: obtaining one or more picking tasks corresponding to one or more picking areas; establishing a correspondence between the one or more picking tasks and an item carrying apparatus; and for each of the one or more picking tasks, determining a corresponding drive apparatus, and sending, to the drive apparatus, movement data generated according to the each picking task, causing the drive apparatus to move the item carrying apparatus to a target picking area corresponding to the picking task; and sending the each picking task to a picking device corresponding to the target picking area, causing the picking device to complete the picking task in the target picking area.

In some embodiments, the obtaining one or more picking tasks comprises: obtaining a picking list, wherein the picking list comprises a total picking task of picking items located in different picking areas; and dividing the total picking task into the one or more picking tasks according to the different picking areas.

In some embodiments, the determining a corresponding drive apparatus for the each of the one or more picking tasks comprises: determining an arrangement order of the one or more picking tasks; and sequentially determining each of the one or more picking tasks according to the arrangement order, and determining the corresponding drive apparatus for the each picking task.

In some embodiments, the determining an arrangement order of the one or more picking tasks comprises: determining the arrangement order of the one or more picking tasks according to load states of the picking areas, wherein a duration of completing picking tasks corresponding to the determined arrangement order satisfies a preset duration condition; and the load states of the picking areas comprise at least one of: a completion progress of the picking tasks corresponding to the picking areas, a duration needed to complete the picking tasks corresponding to the picking areas, a quantity of the picking tasks corresponding to the picking areas, or picking capabilities corresponding to the picking areas.

In some embodiments, the determining a corresponding drive apparatus for the each of the one or more picking tasks comprises: determining the corresponding drive apparatus for the each of the one or more picking tasks according to at least one of a travel cost of the drive apparatus or a waiting cost of the item carrying apparatus.

In some embodiments, the sending, to the drive apparatus, movement data generated according to the each picking task comprises: using a position of the item carrying apparatus as a start point position, and using a position of the target picking area corresponding to the picking task as an end point position; and generating the movement data according to the start point position and the end point position, and sending the movement data to the drive apparatus.

In some embodiments, the generating the movement data according to the start point position and the end point position comprises: using the start point position and the end point position as the movement data.

In some embodiments, the generating the movement data according to the start point position and the end point position comprises: planning a movement route from the start point position to the end point position according to a spatial layout of storage spaces of the picking areas, and using the movement route as the movement data.

In some embodiments, the sending the each picking task to a picking device corresponding to the target picking area comprises: sending the each picking task to the item carrying apparatus, wherein the each picking task is sent, after the item carrying apparatus is moved to the target picking area corresponding to the each picking task, by the item carrying apparatus to the picking device corresponding to the target picking area.

In some embodiments, the picking task comprises: picking an item based on at least one of an identifier of the item or an identifier of the item carrying apparatus.

In some embodiments, one or more storage containers are disposed on the item carrying apparatus, and the picking task comprises: picking an item based on at least one of an identifier of item, an identifier of the item carrying apparatus, or an identifier of the storage container.

In some embodiments, sending a storage container layout of the item carrying apparatus to the item carrying apparatus or the picking device, wherein the storage container layout represents positions of the storage containers on the item carrying apparatus, and the storage container layout is displayed on the item carrying apparatus or the picking device correspondingly.

According to another aspect, an item picking method, implementable by a drive apparatus, may comprise: receiving movement data sent by a picking management device, wherein the movement data comprises a start point position and an end point position, the start point position represents a position of an item carrying apparatus, and the end point position represents a position of a picking area corresponding to a picking task associated with the item carrying apparatus; and moving the item carrying apparatus according to the movement data to the picking area.

In some embodiments, the movement data comprises the start point position and the end point position; and the moving the item carrying apparatus according to the movement data to the picking area comprises: obtaining a spatial layout of a storage space of the picking area, and planning a movement route from the start point position to the end point position according to the spatial layout; and moving the item carrying apparatus according to the movement route.

In some embodiments, the item picking method further comprises: receiving a picking task sent by the picking management device; and sending the picking task to a picking device.

According to yet another aspect, an item picking method, implementable by an item carrying apparatus, may comprise: receiving a picking task sent by a picking management device; and sending the picking task to a picking device.

In some embodiments, one or more storage containers are disposed on the item carrying apparatus, and the item picking method further comprises: receiving a storage container layout of the item carrying apparatus sent by the picking management device, wherein the storage container layout represents positions of the storage containers on the item carrying apparatus; and displaying the storage container layout.

According to yet another aspect, a picking management device may comprise (1) a processor configured to: obtain one or more picking tasks corresponding to one or more picking areas; establish a correspondence between the one or more picking tasks and an item carrying apparatus; determine a corresponding drive apparatus for each of the one or more picking tasks; and generate movement data according to the picking task; and (2) a communication interface configured to: send the movement data to the drive apparatus, wherein the movement data is used by the drive apparatus to move the item carrying apparatus to a target picking area corresponding to the picking task; and send the picking task to a picking device corresponding to the target picking area, to instruct the picking device to complete the picking task in the target picking area.

According to yet another aspect, a drive apparatus may comprise (1) a communication interface configured to receive movement data sent by a picking management device, wherein the movement data comprises a start point position and an end point position, the start point position represents a position of an item carrying apparatus, and the end point position represents a position of a picking area associated with a picking task corresponding to the item carrying apparatus; and (2) a processor configured to send a move instruction to a traction module according to the movement data; and (3) the traction module configured to move the item carrying apparatus according to the move instruction, causing the item carrying apparatus to be moved to the picking area.

According to yet another aspect, an item carrying apparatus may comprise (1) a communication interface configured to: receive a picking task sent by a picking management device; and send the picking task to a picking device; and (2) a carrying module configured to carry an item picked by the picking device according to the picking task.

According to yet another aspect, an item picking system may comprise: (1) a picking management device configured to: obtain one or more picking tasks corresponding to one or more picking areas; establish a correspondence between the one or more picking tasks and an item carrying apparatus; determine a corresponding drive apparatus for each of the one or more picking tasks; send, to the drive apparatus, movement data generated according to the picking task; and send the each picking task to a picking device corresponding to a target picking area corresponding to the picking task; (2) the drive apparatus configured to move the item carrying apparatus according to the movement data to the target picking area; and (3) the picking device configured to complete the picking task in the target picking area.

According to yet another aspect, an item picking apparatus, implementable by a picking management device, may comprise: (1) a picking task obtaining module configured to obtain one or more picking tasks, wherein picking tasks correspond to one or more picking areas; (2) a correspondence establishment module configured to establish a correspondence between the one or more picking tasks and an item carrying apparatus; and (3) a picking task execution module configured to: determine a corresponding drive apparatus for a picking task of the one or more picking tasks, and send, to the drive apparatus, movement data generated according to the picking task, causing the drive apparatus to move the item carrying apparatus to a target picking area corresponding to the picking task; and send the picking task to a picking device corresponding to the target picking area, causing the picking device to complete the picking task in the target picking area.

According to yet another aspect, an item picking apparatus, implementable by a drive apparatus, may comprise: (1) a movement data receiving module configured to receive movement data sent by a picking management device, wherein the movement data comprises a start point position and an end point position, the start point position represents a position of an item carrying apparatus, and the end point position represents a position of a picking area associated with a picking task corresponding to the item carrying apparatus; and (2) a traction module configured to move the item carrying apparatus according to the movement data, causing the item carrying apparatus to be moved to the picking area. According to yet another aspect, an item picking apparatus, implementable by an item carrying apparatus, may comprise: (1) a picking task receiving module configured to receive a picking task sent by a picking management device; and (2) a picking task sending module configured to: send the picking task to a picking device.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Though the accompanying drawings in the following description show only some embodiments of the present disclosure, a person of ordinary skill in the art may still derive other drawings from these provided accompanying drawings without creative efforts.

FIG. 7A is a schematic structural diagram of a drive apparatus according to some embodiments of the present disclosure;

FIG. 7B is a flowchart of another item picking method, according to some embodiments of the present disclosure;

DETAILED DESCRIPTION

Figure 1:
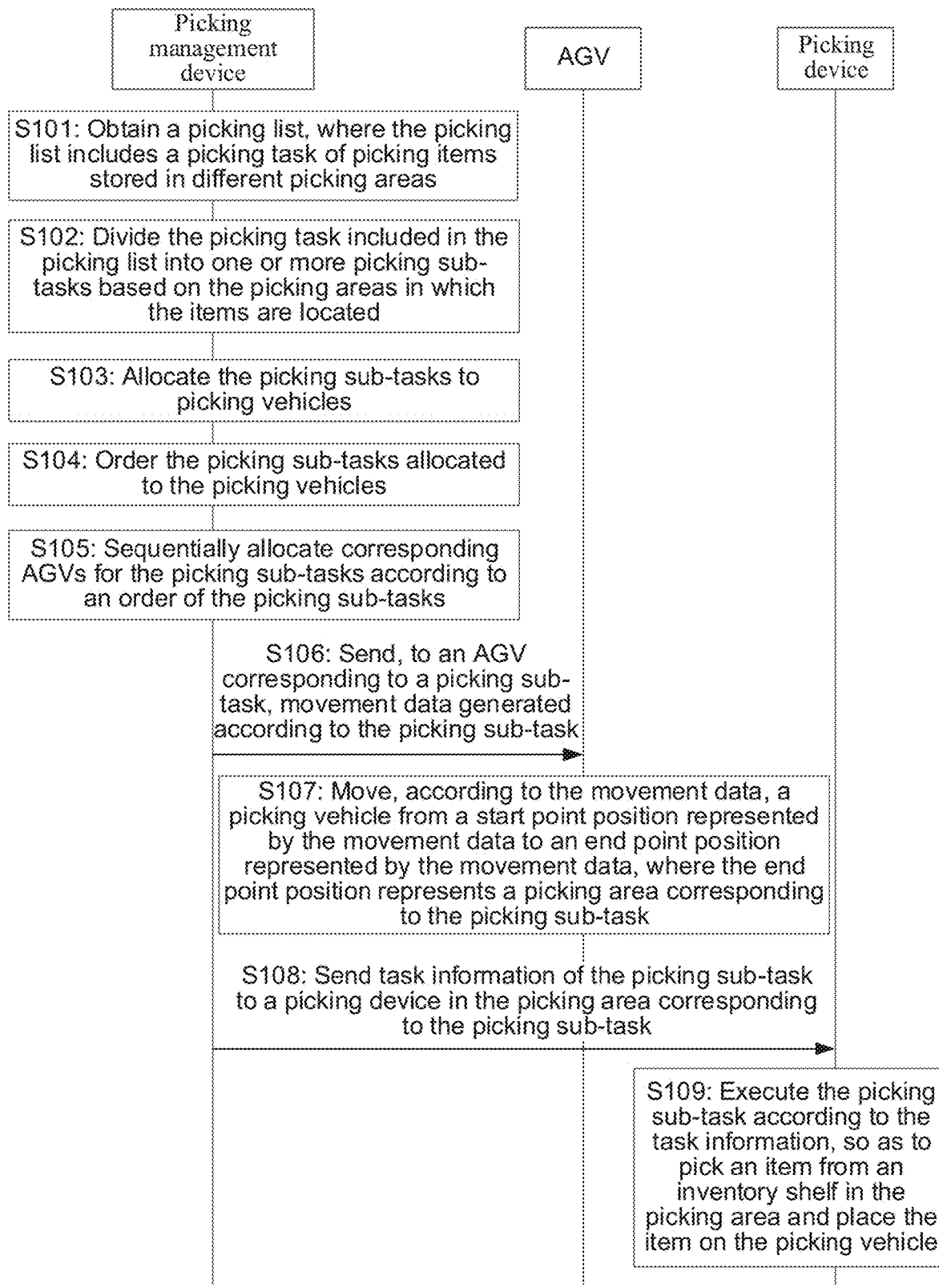
FIG. 1 is a flowchart of an item picking method implementable by an item picking system according to some embodiments of the present disclosure.

The following embodiments as described are some rather than all of the embodiments. All other embodiments obtainable by a person of ordinary skill in the art based on the embodiments of the present disclosure without creative efforts shall fall within the protection scope of the present disclosure.

Items such as goods may be stored in a storage space such as a warehouse. An item storage apparatus may be disposed in the storage space. A storage unit can be disposed on the item storage apparatus, and can be configured to store an item. For example, the item storage apparatus is an inventory shelf. The inventory shelf includes multiple storage bins. The storage bins are configured to store items. An item in the storage space needs to be picked from the storage unit. Generally, the storage space has a relatively large area and stores a relatively large quantity of items. To improve item picking efficiency, picking apparatuses can be used to complete the picking task. The picking apparatuses may include an item carrying apparatus and a drive apparatus.

The item carrying apparatus is configured to store an item picked from a storage bin. The drive apparatus is configured to move the item carrying apparatus from a position to another, thereby achieving the objective of conveying a picked item from a position to another.

To manage the item picking task, a picking management device may be used. The picking management device may perform an item picking method to determine control information to be sent to the drive apparatus and/or the item carrying apparatus. The picking management device may communicate with the drive apparatus and/or the item carrying apparatus, and send the control information to the drive apparatus and/or the item carrying apparatus, causing the drive apparatus and/or the item carrying apparatus to complete respective tasks in the item picking work according to the control information.

In some embodiments, a system that includes the picking management device, the item carrying apparatus, and the drive apparatus may be referred to as an item picking system. An item stored on the item storage apparatus may also be referred to as a picking object. The picking management device may perform a picking method on the picking object. The storage space in which the item storage apparatus is located may also be referred to as a picking work space (or referred to as a working space for short).

In an application scenario, the item picking system may be applied to a scenario of managing a mail order warehouse. The application scenario is used as an example below to describe the item picking system provided in the present disclosure. In an application scenario of managing the mail order warehouse, the storage space may be a warehouse, and the picking object may be an item that is included in a mail order (which may be referred to as an order for short) and is stored in the warehouse. The item carrying apparatus may be a picking vehicle. The drive apparatus may be a moving robot, such as an automated guided vehicle (AGV).

FIG. 1 shows a procedure of an item picking method according to some embodiments of the present disclosure. The item picking method may include the following steps S101 to S109.

S101: A picking management device obtains a picking list, where the picking list includes a picking task of picking items in different picking areas.

The item picking method shown in FIG. 1 is implementable by an item picking system. The item picking system includes the picking management device. The picking management device may obtain one or more user-generated orders. An order includes one or more items. When multiple orders are obtained, the picking management device may combine the multiple orders into one picking list. A basis for the combination may be a property of an order (for example, a delivery time and/or a type of an included item) or a alternative standard. The picking list in the picking management device may be not generated by the picking management device, but instead, is obtained from another device or entered by a user.

Figure 2:
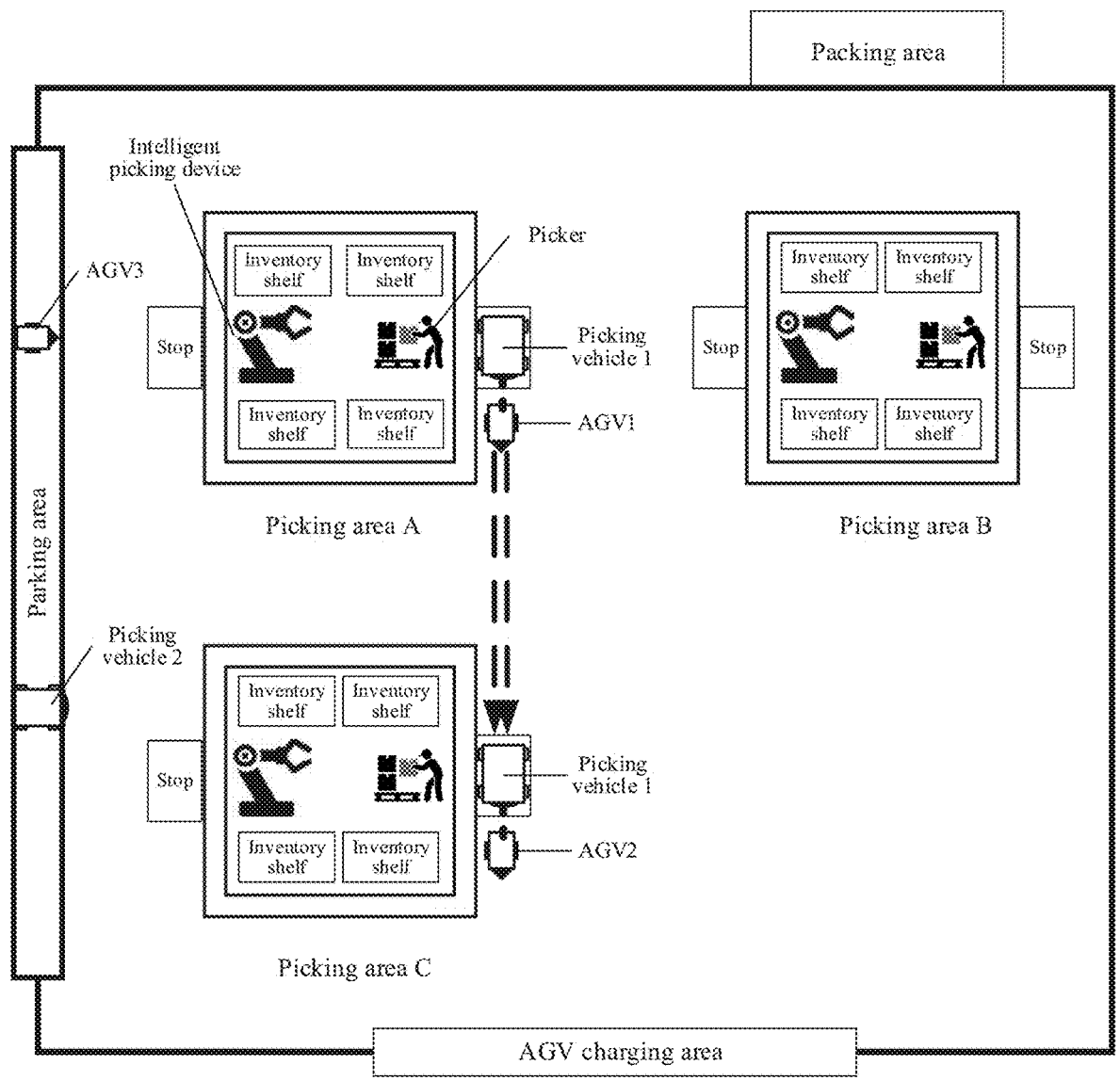
FIG. 2 is a schematic diagram of a disclosed scenario of an item picking method according to some embodiments of the present disclosure.

FIG. 2 is a schematic of an application scenario of managing a mail order warehouse. As shown in FIG. 2, a warehouse may include multiple picking areas. Different types of items are stored on inventory shelves in different picking areas. One picking list includes multiple items. Different items may be stored in the different picking areas. For example, a picking list 001 includes ten items, and includes: five down coats, three pairs of shoes, and two scarves. Down coats are stored in a picking area A, shoes are stored in a picking area B, and scarves are stored in a picking area C.

The task of picking items from the picking areas may be referred to as a picking task.

S102: The picking management device divides the picking task included in the picking list into one or more picking sub-tasks based on the picking areas in which the items are located.

The picking management device may divide, according to the picking areas in which the items in one picking list are located, a picking task included in the picking list into one or more picking sub-tasks. Continuing the foregoing example, a picking task included in the picking list 001 may be divided into three picking sub-tasks, which are: picking an item from the picking area A, picking an item from the picking area B, and picking an item from the picking area C.

In some embodiments, a picking sub-task obtained through division may be referred to as a picking task, and correspondingly, a picking task in the picking list is referred to as a total picking task.

S103: The picking management device allocates the picking sub-tasks to picking vehicles, where the allocation represents establishing a correspondence between a picking sub-task and a picking vehicle.

Picking vehicles can be disposed in the warehouse. One or more storage containers are disposed on the picking vehicle and are configured to store items that are picked from picking areas and that correspond to the picking sub-tasks. The picking management device may allocate a generated picking sub-task to the picking vehicle. A basis for allocating a picking sub-task may include, but is not limited to, a property characteristic of an item, for example, a size of an item to be picked in the picking sub-task, or a type of a carrying container for storage. After a picking sub-task in the picking list is allocated to the picking vehicle, the picking vehicle and the picking sub-task have a corresponding relationship. In this way, the item to be picked in the picking sub-task may be stored in the picking vehicle corresponding to the picking sub-task. After the item is placed in the picking vehicle, the picking vehicle may be used to effectuate movement of the item.

For example, one picking vehicle may correspond to one picking list. That is, all picking sub-tasks included in one picking list can be allocated to the picking vehicle. Alternatively, one picking vehicle may correspond to multiple different picking lists. That is, picking sub-tasks included in multiple different picking lists can be allocated to one picking vehicle. Alternatively, multiple picking vehicles correspond to one picking list. That is, picking sub-tasks included in one picking list can be allocated to multiple picking vehicles. The correspondence between a picking vehicle and a picking list may refer to loading the picked item in the picking list to the picking vehicle.

For example, three picking sub-tasks in the picking list 001 are allocated to a picking vehicle 1. Thus, the picking vehicle 1 needs to go to the picking area A, the picking area B, and the picking area C to complete the picking work corresponding to the picking list 001. For another example, a picking list 002 includes two picking sub-tasks. The two picking sub-tasks respectively correspond to the picking area A and the picking area B. The picking list 002 is allocated to a picking vehicle 2. Thus, the picking vehicle 2 needs to go to the picking area A and the picking area B to complete the picking work corresponding to the picking list 002.

S104: The picking management device orders the picking sub-tasks allocated to the picking vehicles.

The picking management device may allocate one or more picking sub-tasks to the picking vehicle. When multiple picking sub-tasks are allocated to the picking vehicle, the picking vehicle may execute the multiple picking sub-tasks according to a particular sequence. In addition, there may be multiple picking vehicles. Different picking vehicles may go to the same or different picking area. When a picking capability of one picking area too limited to match all the picking vehicles in the picking area at the same time, picking sub-tasks of different picking vehicles can be sequentially executed. Therefore, the picking management device may order all the picking sub-tasks of all the picking vehicles. In some embodiments, the picking management device may order picking tasks allocated to only one picking vehicle.

The ordering can be a scheduling process. The picking management device may use a combinatorial optimization solution algorithm to order picking sub-tasks. A basis for ordering may be load states of the picking areas, and may include, but is not limited to, any one or more of the following: duration needed to complete the picking sub-tasks corresponding to the picking areas, a progress of completing the picking sub-tasks corresponding to the picking areas, and a picking capability corresponding to the picking areas, a quantity of picking vehicles (e.g., picking sub-tasks) corresponding to the picking areas, and a distance between the picking areas. The picking capability represents a capability of picking a quantity of items from a picking area, and may be picking efficiency, duration needed to pick a specific quantity of items, and the like. The quantity of picking vehicles corresponding to a picking area represents a quantity of picking vehicles that are waiting and/or picking items in the picking area. When the picking sub-tasks have priorities, the picking sub-tasks may be first ordered according to priorities and then ordered according to the foregoing ordering basis.

In some embodiments, an objective of ordering the picking sub-tasks is to ensure that the total duration for the picking vehicle or all picking vehicles to complete the picking sub-tasks meets a preset duration condition. The duration condition may be a shortest duration limit or within a preset duration range. A condition other than duration may further be used as an ordering condition. Regardless of the ordering condition, an ordering result of the picking sub-tasks needs to satisfy a preset ordering condition.

An ordering result of the picking sub-tasks by the picking management device may represent an execution sequence of the picking sub-tasks corresponding to a picking vehicle in a picking area. The ordering result not only may represent the execution sequence of the picking sub-tasks corresponding to the picking area, but also may represent an execution sequence of the picking sub-tasks corresponding to the picking vehicle.

For example, the picking management device determines that currently there are nine uncompleted picking sub-tasks. As shown in Table 1 below, the nine picking sub-tasks are: a picking sub-task 1001, a picking sub-task 1002, a picking sub-task 1003, a picking sub-task 2001, a picking sub-task 2002, . . . , and a picking sub-task 4002. A picking area corresponding to single-underlined picking sub-tasks (the picking sub-task 1001, the picking sub-task 2001, and the picking sub-task 3001) is the picking area A. A picking area corresponding to double-underlined picking sub-tasks (the picking sub-task 1002, the picking sub-task 2002, and the picking sub-task 4001) is the picking area B. A picking area corresponding to wavy-underlined picking sub-tasks (the picking sub-task 1003, the picking sub-task 3002, and the picking sub-task 4002) is the picking area C.

Moreover, picking sub-tasks allocated to the picking vehicle 1 include the picking sub-task 1001, the picking sub-task 1002, and the picking sub-task 1003. Thus, the picking vehicle 1 needs to separately go to the picking area A, the picking area B, and the picking area C. Picking sub-tasks allocated to the picking vehicle 2 include the picking sub-task 2001 and the picking sub-task 2002. Thus, the picking vehicle 2 needs to separately go to the picking area A and the picking area B. Picking sub-tasks allocated to a picking vehicle 3 include the picking sub-task 3001 and the picking sub-task 3002. Thus, the picking vehicle 3 needs to separately go to the picking area A and the picking area C. Picking sub-tasks allocated to a picking vehicle 4 include the picking sub-task 4001 and the picking sub-task 4002. Thus, the picking vehicle 4 needs to separately go to the picking area B and the picking area C. The sequence of going to picking areas described here is not a sequence of an ordering result, but instead, only describes picking areas that a picking vehicle needs to go to.

TABLE 1

| Picking vehicle number | Picking sub-task number | Picking sub-task number | Picking sub-task number |
|---|---|---|---|
| 1 | 1001 | 1002 | 1003 |
| 2 | 2001 | 2002 | |
| 3 | 3001 | 3002 | |
| 4 | 4001 | 4002 | |

Figure 3:
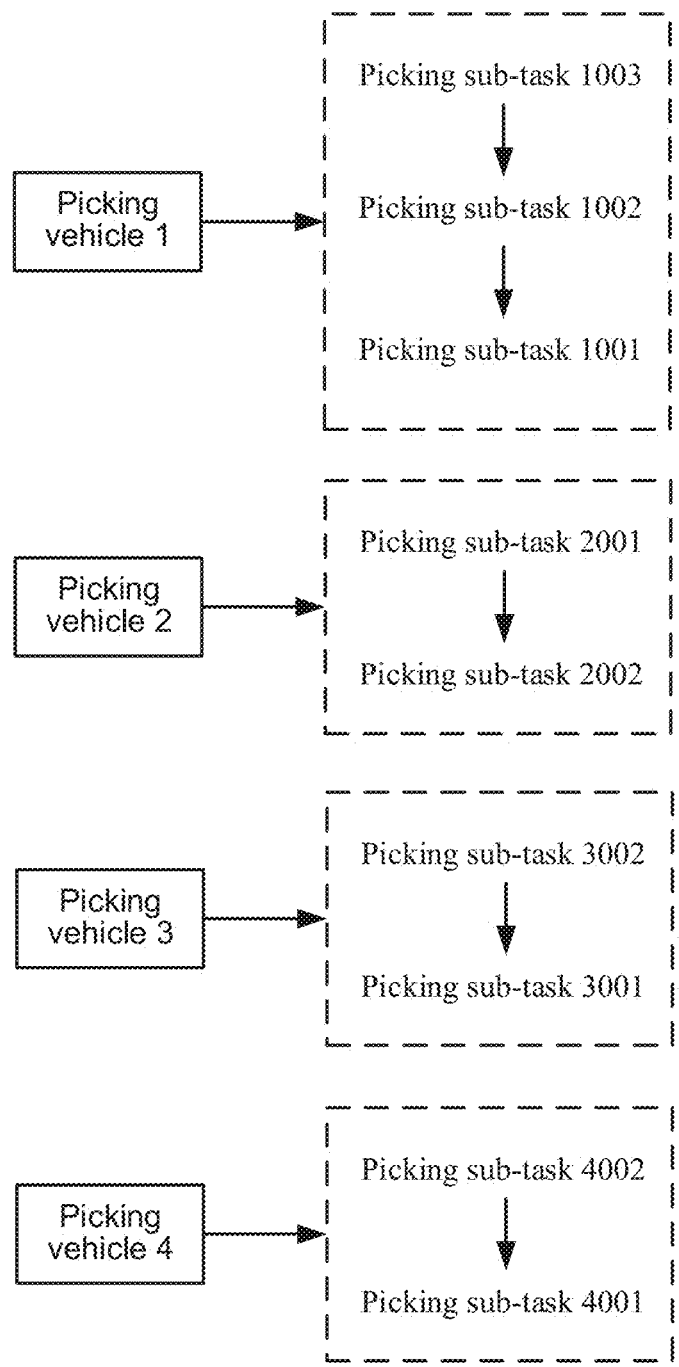
FIG. 3 is a schematic diagram of an order of multiple picking sub-tasks corresponding to a picking vehicle according to some embodiments of the present disclosure.

It is assumed that as shown in FIG. 3, the ordering results of ordering the foregoing picking sub-tasks shown in Table 1 for picking vehicles are as follows: an execution sequence of picking sub-tasks corresponding to the picking vehicle 1 includes the picking sub-task 1003, the picking sub-task 1002, and the picking sub-task 1001; an execution sequence of picking sub-tasks corresponding to the picking vehicle 2 includes the picking sub-task 2001 and the picking sub-task 2002; an execution sequence of picking sub-tasks corresponding to the picking vehicle 3 includes the picking sub-task 3002 and the picking sub-task 3001; and an execution sequence of picking sub-tasks corresponding to the picking vehicle 4 includes the picking sub-task 4002 and the picking sub-task 4001.

Figure 4:
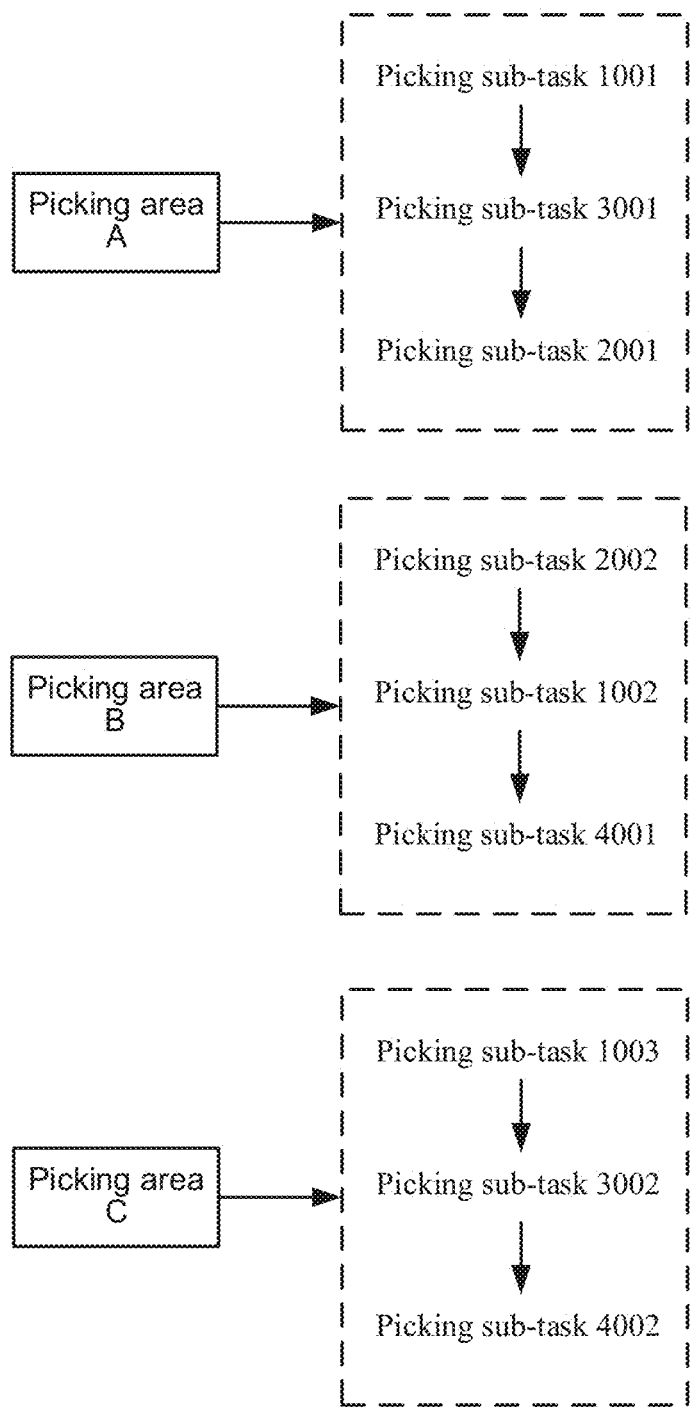
FIG. 4 is a schematic diagram of an order of multiple picking sub-tasks corresponding to a picking area according to some embodiments of the present disclosure.

For a picking area, as shown in FIG. 4, an execution sequence of the picking sub-tasks corresponding to the picking area A is sequentially: the picking sub-task 1001, the picking sub-task 3001, and the picking sub-task 2001. An execution sequence of the picking sub-tasks corresponding to the picking area B is sequentially: the picking sub-task 2002, the picking sub-task 1002, and the picking sub-task 4001. An execution sequence of the picking sub-tasks corresponding to the picking area C is sequentially: the picking sub-task 1003, the picking sub-task 3002, and the picking sub-task 4002.

S105: The picking management device sequentially allocates corresponding AGVs for the picking sub-tasks according to an order of the picking sub-tasks.

After obtaining the ordering results of the picking sub-tasks, the picking management device may determine an execution sequence of the picking sub-tasks respectively corresponding to the picking vehicle(s). For any one picking vehicle, according to an execution sequence of the picking sub-tasks corresponding to the picking vehicle, an AGV is allocated for the each picking sub-task. The AGV has a traction component, and may move (e.g., pull) the picking vehicle to a picking area corresponding to the picking sub-task, for it to pick an item corresponding to the picking sub-task from an inventory shelf of the picking area and store the item in the picking vehicle.

In some embodiments, when an AGV is allocated for a picking sub-task, an allocation basis may include a travel cost of the AGV and/or a waiting cost of the picking vehicle. The travel cost of the AGV may include, but is not limited to, a length of a path along which the AGV passes to arrive at a position of the picking vehicle corresponding to the picking sub-task, and/or a duration (congestion on a path can be considered as a part of the duration) needed by the AGV to arrive at the position of the picking vehicle corresponding to the picking sub-task. The waiting cost of the picking vehicle may include, but is not limited to, a priority of the picking vehicle and/or waiting duration of the picking vehicle. During allocation, an allocation cost matrix of a picking sub-task and an AGV may be calculated, and an AGV allocated for each picking sub-task can be obtained by using an allocation optimization algorithm.

In some embodiments, a result of the allocation is to minimize a travel cost of executing a picking sub-task by each AGV and/or minimize the waiting cost of the picking vehicle corresponding to a picking sub-task. After an allocation condition is preset, an allocation result may need to satisfy the allocation condition.

S106: The picking management device sends, to an AGV corresponding to a picking sub-task, movement data generated according to the picking sub-task.

When the picking management device determines an allocation relationship between a picking sub-task and an AGV, the picking management device determines, for the each picking sub-task, a current position of a picking vehicle corresponding to the picking sub-task, uses the position as a start point position, determines a picking area corresponding to the picking sub-task, and uses a position of the picking area as an end point position.

In some embodiments, when picking is started, the picking vehicle may be parked in a preset position in a preset parking area. When the picking management device allocates an AGV for a first picking sub-task corresponding to the picking vehicle, a determined start point position is a preset parking position of the picking vehicle. During picking, when the picking management device allocates an AGV for a non-first picking sub-task of the picking vehicle, the picking vehicle is parked in a position of a picking area corresponding to a picking sub-task that has most recently been completed, because the picking vehicle has just completed one or more picking sub-tasks. The determined start point position is a position of the picking area corresponding to the picking sub-task that has just been completed. In addition, here, the position of the picking area represents the position corresponding to the picking area. For example, the position is a position of a stop (a schematic of a stop shown in FIG. 2) included in a picking area. The stop represents a preset parking position after the picking vehicle arrives at the picking area.

The picking management device may determine movement data of an AGV according to the start point position and the end point position. The movement data represents that the picking vehicle corresponding to the picking sub-task is to be moved from the start point position corresponding to the movement data to the end point position corresponding to the movement data. After the movement data is determined, the picking management device sends the movement data to the AGV.

In an example, the movement data is the foregoing start point position and end point position. The picking management device may send the start point position and the end point position corresponding to the picking sub-task to the AGV, to represent that the AGV moves the picking vehicle corresponding to the picking sub-task from the start point position to the end point position. In another example, the movement data is a movement route that includes the foregoing start point position and end point position. In one example, the picking management device may obtain a spatial layout view of the warehouse, and may plan the movement route according to the spatial layout view of the warehouse, the start point position, and the end point position. In this way, instead of sending only the start point position and the end point position to the AGV, the picking management device sends the movement route. The movement data may be not limited to the foregoing two forms, and may be in another form.

S107: The AGV moves, according to the movement data, a picking vehicle from a start point position represented by the movement data to an end point position represented by the movement data.

After receiving the movement data sent by the picking management device, the AGV may determine the start point position and the end point position that are represented by the movement data. The start point position represents a position of the picking vehicle corresponding to the picking sub-task. The end point position represents a position of a picking area corresponding to the picking sub-task. The AGV first moves to the start point position, and then moves the picking vehicle in the start point position to a picking area corresponding to the end point position.

In some embodiments, a component for joining the AGV and the picking vehicle may be disposed on the AGV, so as to join the AGV and the picking vehicle. In an example, a navigation apparatus is disposed in the AGV and a layout view of the warehouse is built in the AGV. In this way, the AGV may autonomously plan a movement route according to the start point position and the end point position, and travel along the planned movement route. In another example, the AGV may not store the layout view of the warehouse. The AGV receives a movement route, and travels to an end point position of the movement route along the movement route according to the navigation of a navigation apparatus. In some embodiments, after the AGV moves the picking vehicle to the end point position represented by the movement data, the picking vehicle may be detached from the AGV. In some embodiments, the AGV and/or the picking vehicle may be configured to move along a track, a rail, or another guide or support component. For example, movement components such as rollers or wheel belts may be disposed on the AGV and/or the picking vehicle and configured to effectuate autonomous movement.

Figure 5:
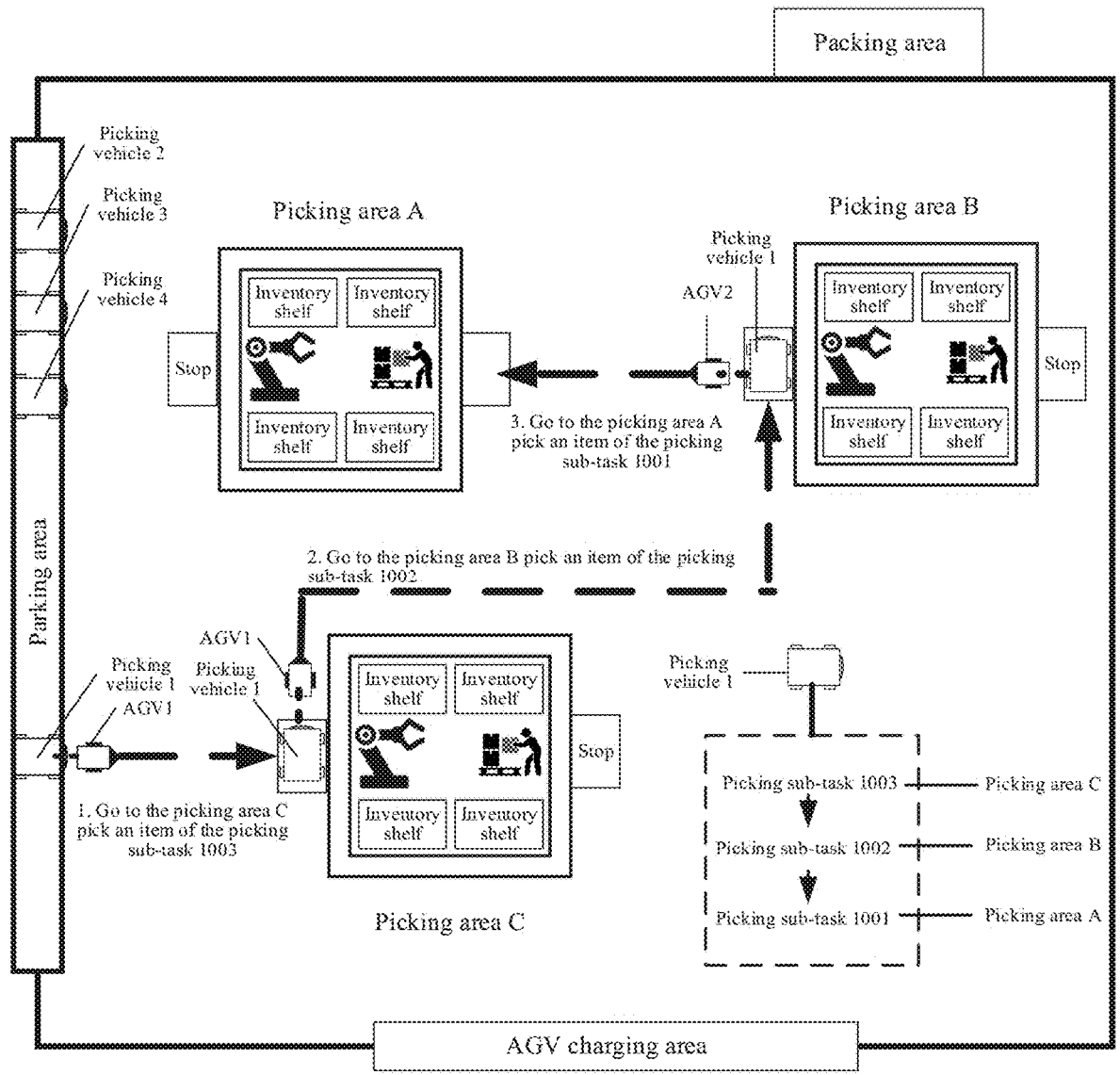
FIG. 5 is a schematic diagram of an automated guided vehicle (AGV) moving a picking vehicle based on each picking sub-task according to some embodiments of the present disclosure.

For a schematic of a scenario of a warehouse shown in FIG. 5, two AGVs (AGV1 and AGV2) are equipped in the warehouse. Four picking vehicles are equipped in the warehouse. The four picking vehicles are the picking vehicle 1, the picking vehicle 2, the picking vehicle 3, and the picking vehicle 4 in Table 1. The ordering results of the picking sub-tasks corresponding to the picking vehicles are still shown as above. The picking vehicle 1 is used as an example. An execution sequence of picking sub-tasks corresponding to the picking vehicle 1 includes: the picking sub-task 1003, the picking sub-task 1002, and the picking sub-task 1001. It is assumed that an AGV allocated for the picking sub-task 1003 is AGV1, an AGV allocated for the picking sub-task 1002 is AGV1, and an AGV allocated for the picking sub-task 1001 is AGV2.

As shown in FIG. 5, AGV1 first moves the picking vehicle 1 from the preset parking position to the picking area C corresponding to the picking sub-task 1003, and then AGV1 moves the picking vehicle 1 from the picking area C to the picking area B corresponding to the picking sub-task 1002, and eventually AGV2 moves the picking vehicle 1 from the picking area B to the picking area A corresponding to the picking sub-task 1001.

S108: The picking management device sends task information of the picking sub-task to a picking device in the picking area corresponding to the picking sub-task.

Each picking area has a respective corresponding picking device configured to implement picking of an item. For example, an automated picking apparatus (for example, a robotic arm) may be disposed in a picking area and configured to take out an item stored on an inventory shelf and place the item in the picking vehicle. Alternatively, an automated picking apparatus is not disposed in a picking area, but instead, a picker completes the work of taking out an item stored on an inventory shelf and placing the item in the picking vehicle.

A correspondence between a picking sub-task and a picking area is stored in the picking management device. Moreover, a correspondence between a picking area and a picking device may further be stored in the picking management device. In this way, after determining a picking sub-task, the picking management device may determine, based on a picking area, the picking device to which the picking sub-task needs to be sent.

In an example, the picking device may be an intelligent picking device that includes an automated picking apparatus such as a robotic arm. A communications module may further be disposed on the intelligent picking device and is configured to receive task information sent by the picking management device. In another example, the picking device may include a mobile phone, a tablet computer, a desktop computer, or another terminal that has a display function. The terminal receives task information of a picking sub-task and may display the task information. The picker picks an item according to the task information displayed by the terminal.

An item in a picking area is stored on an inventory shelf. Storage bins are disposed on the inventory shelf. Each storage bin has a unique bin identifier. For example, task information of a picking sub-task includes a bin identifier (or an item identifier) and a picking vehicle identifier. It may be determined according to the task information of the picking sub-task that an item in a storage bin corresponding to the bin identifier is to be picked and placed in a picking vehicle corresponding to the picking vehicle identifier.

Further, for the accuracy of determining an item to be picked, the task information may further include an item name. Alternatively, the task information may further include an item quantity, to represent a quantity of items that need to be picked in the picking sub-task.

In some embodiments, the sending of the task information of the picking sub-task by the picking management device to the picking device is not limited to being performed at the step. After a picking vehicle is allocated for a picking sub-task, the task information of the picking sub-task may be sent to the picking device at any time.

S109: The picking device receives the task information, and then executes the picking sub-task corresponding to the task information.

Before a picking sub-task is executed, the picking device may further obtain the picking vehicle identifier from the picking vehicle. The picking vehicle identifier may include a two-dimensional barcode, a radio frequency (RF) label, or the like. A scanning module may be provided on the picking device. The scanning module may scan the two-dimensional barcode or the RF label to obtain the picking vehicle identifier.

The picking device executes the picking sub-task corresponding to the task information. If the picking device is a terminal, the terminal displays the task information. The picker picks an item from a storage bin and places the item in the picking vehicle. If the picking device is an intelligent picking device, the intelligent picking device picks an item from the storage bin and places the item in the picking vehicle. Before the picking device executes a picking sub-task, the picking vehicle already arrives at the picking area corresponding to the picking sub-task.

As described in the item picking method above, an item stored in a warehouse can be picked and placed in a picking vehicle. For example, the warehouse may be divided into multiple picking areas. A picking management device may divide a picking task for items into different picking sub-tasks according to picking areas in which the items are located. One picking vehicle corresponds to several picking sub-tasks. The picking management device allocates an AGV for a picking sub-task, causing the AGV to move the picking vehicle to a picking area corresponding to the picking sub-task. The picking management device may send task information of the picking sub-task to a picking device corresponding to the picking area. The picking device executes the picking sub-task according to the task information, so as to pick an item and place the item in the picking vehicle, achieving automatic item picking.

In some embodiments, in the item picking method, the picking vehicle may be separate from the AGV. That is, after the AGV completes a previous picking sub-task on the picking vehicle, another AGV may be used to complete a next picking sub-task, thereby improving the utilization of AGVs. Picking sub-tasks have an execution sequence, and the ordering of the picking sub-tasks is to obtain a sequence that satisfies a preset ordering condition. Therefore, a corresponding ordering condition may be set according to a preset requirement, such that the completion result of a picking task satisfies the preset requirement, thereby achieving the flexibility of item picking.

In some embodiments, multiple storage containers may be disposed on a picking vehicle. An identifier may be included on each storage container. The identifier may be included in an identifier label. The identifier label may be disposed on the storage container. A form of the identifier label may be, but is not limited to, a two-dimensional barcode, a text, or a picture.

Before placing a to-be-stored item in a picking vehicle, an intelligent picking device first determines a storage container corresponding to the item. For ease of description, the storage container corresponding to the item may be referred to as a target storage container, and the item is then stored in the target storage container. An implementation manner in which the intelligent picking device determines the storage container corresponding to the item may be that the picking management device adds an identifier of the storage container to task information of a picking sub-task, and sends the task information to the intelligent picking device. Alternatively, the picking management device may send the identifier of the storage container to the picking vehicle. A communications module can be disposed on the picking vehicle. The intelligent picking device may obtain the identifier of the storage container by using the communications module on the picking vehicle.

During manual picking, a terminal of a picker may obtain an identifier of a target storage container corresponding to an item from the picking management device or the picking vehicle. The picker (e.g., a person) then searches for a storage container corresponding to the identifier according to the identifier on the picking vehicle, and stores the item in the found storage container. The storage container is the target storage container.

Further, to make it convenient for the picker to quickly search for a storage container on the picking vehicle, a layout diagram in a two-dimensional form, a three-dimensional form, or the like of storage containers on the picking vehicle may be displayed on the picking vehicle or the terminal of the picker. The layout diagram represents a correspondence between an identifier of a storage container and a position of the picking vehicle. The picker may rapidly determine, according to the layout diagram and an identifier of a target storage container, a position of the target storage container on the picking vehicle.

Further, to ensure the accuracy of a storage position, before storing an item in a target storage container, the intelligent picking device may obtain a first identifier of the target storage container from the picking management device, and scan an identifier label disposed on the target storage container to obtain a second identifier of the target storage container. When the first identifier is the same as the second identifier, the item is stored in the target storage container.

In addition, a storage space is not limited to such a fixed, predetermined, and limited physical space like the foregoing mail order warehouse, and may be a working space having a variable size and/or any structure. In addition, the storage space may be completely enclosed in a building, and may further be partially located outdoors, completely located outdoors, or located in a transportation tool. Alternatively, the storage space may not be limited to any fixed structure.

The storage space may be divided into multiple areas. The areas may be square, rectangular or polygonal and/or have any other shape. Different storage spaces are configured to store different types of picking objects.

In addition, a packing area may further be set up in the storage space. After picking sub-tasks corresponding to the picking vehicle are all executed, an AGV may further move the picking vehicle to the packing area. A packing device in the packing area packs an item in the picking vehicle.

In an implementation, a manner in which the picking management device sends a picking sub-task to the picking device is not limited to directly sending to the picking device, and may further be sending by using the following exemplary manners.

In a sending manner, an item carrying apparatus is used for sending the picking sub-task. In one example, a communications module and a storage module are disposed on the item carrying apparatus. The picking management device sends a picking sub-task corresponding to the item carrying apparatus to the item carrying apparatus by using the communications module, and stores the picking sub-task in the storage module of the item carrying apparatus.

After the item carrying apparatus is moved by a drive apparatus to a picking area, a picking device in the picking area may obtain a picking sub-task corresponding to the item carrying apparatus from a storage module of the item carrying apparatus. In one example, the picking device may send a task obtaining request to the item carrying apparatus. After receiving the task obtaining request, the item carrying apparatus sends the stored picking task to the picking device. In this sending manner, task information of the picking sub-task may not necessarily include an identifier of the item carrying apparatus. When obtaining task information from the item carrying apparatus and executing a picking sub-task according to the task information, the picking device stores a picked item corresponding to the picking sub-task in the item carrying apparatus storing the task information.

In another sending manner, a drive apparatus is used for sending the picking sub-task. In one example, a communications module and a storage module are disposed on the drive apparatus. After determining a drive apparatus for a picking sub-task, the picking management device sends the picking sub-task to the drive apparatus by using the communications module, and stores the picking sub-task in the storage module of the drive apparatus.

After the drive apparatus moves the item carrying apparatus to a picking area, a picking device in the picking area may obtain the picking sub-task from the storage module of the drive apparatus. In one example, the picking device may send, to the drive apparatus, a task obtaining request. The drive apparatus receives the task obtaining request, and sends the stored picking task to the picking device.

In an implementation, a display unit may further be disposed on the item carrying apparatus and configured to display task information of picking sub-tasks corresponding to the item carrying apparatus, and may display a completion state of a picking sub-task. The completion state of the picking sub-task may include a completion progress. The completion progress may represent a ratio of a quantity of items that are already placed in the item carrying apparatus to a quantity of items included in the picking sub-task. For example, the picking sub-task includes picking ten down coats. When four down coats are picked and placed in the picking vehicle, a completion progress of the picking sub-task is 40%.

The completion state of the picking sub-task may be uploaded to the picking management device. The completion state is used as a basis for ordering picking sub-tasks.

An indication unit such as an indicator lamp may further be disposed on the item carrying apparatus. When the completion state of the picking sub-task is "work in progress," the indication unit indicates a first state, for example, the indicator lamp being red. When the completion state of the picking sub-task is "work completed," the indication unit indicates a second state, for example, the indicator lamp being green.

Figure 6A:
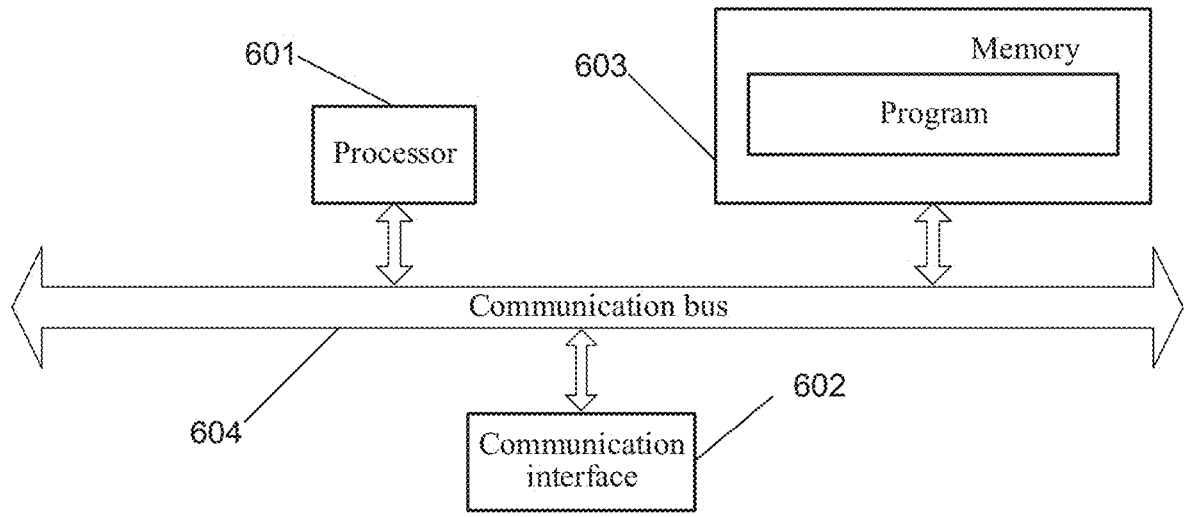
FIG. 6A is a schematic structural diagram of a picking management device according to some embodiments of the present disclosure.

FIG. 6A shows the structure of a picking management device according to the present disclosure. The picking management device includes: a processor 601, a communication interface 602, a memory 603, and a communication bus 604. The processor 601, the communication interface 602, and the memory 603 complete communication with each other by using the communication bus 604.

In one example, the communication interface 602 may be an interface of a communications module, for example, an interface of a Global System for Mobile Communications (GSM) module. The processor 601 is configured to execute a program. The memory 603 is configured to store the program. The program may include program code. The program code includes an operation instruction of the processor.

The processor 601 may be a central processing unit (CPU), or an application-specific integrated circuit (ASIC), or one or more integrated circuits configured to implement the embodiments of the present disclosure.

The memory 603 may include a high-speed random-access memory (RAM), or may further include a non-volatile memory, for example, at least one magnetic disk memory.

The processor 601 is configured to: obtain multiple picking tasks, where different picking tasks correspond to different picking areas; establish a correspondence between the multiple picking tasks and the same item carrying apparatus; determine a corresponding drive apparatus for a picking task of the multiple picking tasks; and generate movement data according to the picking task.

In some embodiments, the processor 601 may further be configured to perform the steps that are in the foregoing item picking method implementable by the picking management device and are related to the foregoing process.

The communication interface 602 is configured to: send the movement data to the drive apparatus, where the movement data is used by the drive apparatus to move the item carrying apparatus to a target picking area corresponding to the picking task; and send the picking task to a picking device corresponding to the target picking area, to instruct the picking device to complete the picking task in the target picking area.

In some embodiments, the communication interface 602 may further be configured to perform the steps that are in the foregoing item picking method applied to the picking management device and are related to the foregoing process.

In an example, the obtaining, by the processor, multiple picking tasks includes: obtaining a picking list, where the picking list includes a total picking task of picking items located in different picking areas; and dividing the total picking task into the multiple picking tasks according to the different picking areas.

In an example, the determining, by the processor, a corresponding drive apparatus for a picking task of the multiple picking tasks includes: determining an arrangement order of the multiple picking tasks; and sequentially using each picking task as the picking task according to the arrangement order, and determining the corresponding drive apparatus for the picking task.

In an example, the determining, by the processor, an arrangement order of the multiple picking tasks includes: determining the arrangement order of the multiple picking tasks according to load states of the picking areas, where duration of completing picking tasks that corresponds to the determined arrangement order meets a preset duration condition, where the load states of the picking areas include any one or any combination of the following: a completion progress of the picking tasks corresponding to the picking areas, duration needed to complete the picking tasks corresponding to the picking areas, a quantity of the picking tasks corresponding to the picking areas, and picking capabilities corresponding to the picking areas.

In an example, the determining, by the processor, a corresponding drive apparatus for a picking task of the multiple picking tasks includes: determining the corresponding drive apparatus for the picking task of the multiple picking tasks according to a travel cost of the drive apparatus and/or a waiting cost of the item carrying apparatus.

In an example, the generating, by the processor, movement data according to the picking task includes: using a position of the item carrying apparatus as a start point position, and using a position of the target picking area corresponding to the picking task as an end point position; and generating the movement data according to the start point position and the end point position.

In an example, the generating, by the processor, movement data according to the start point position and the end point position includes: using the start point position and the end point position as the movement data.

In an example, the generating, by the processor, movement data according to the start point position and the end point position includes: planning a movement route from the start point position to the end point position according to a spatial layout of storage spaces of the picking areas, and using the movement route as the movement data.

In an example, the sending, by the communication interface, the picking task to a picking device corresponding to the target picking area includes: sending the picking task to the item carrying apparatus, where the picking task is sent by the item carrying apparatus to the picking device corresponding to the target picking area, after the item carrying apparatus is moved to the target picking area corresponding to the picking task.

In an example, the picking task includes: identifiers of items and an identifier of the item carrying apparatus.

In an example, multiple storage containers are disposed on the item carrying apparatus, and the picking task includes: identifiers of items, an identifier of the item carrying apparatus, and identifiers of the storage containers.

In an example, the processor is further configured to obtain a storage container layout of the item carrying apparatus.

The communication interface is further configured to send the storage container layout of the item carrying apparatus to the item carrying apparatus or the picking device, where the storage container layout represents positions of the storage containers on the item carrying apparatus, and the storage container layout can be displayed on the item carrying apparatus or the picking device.

Figure 6B:
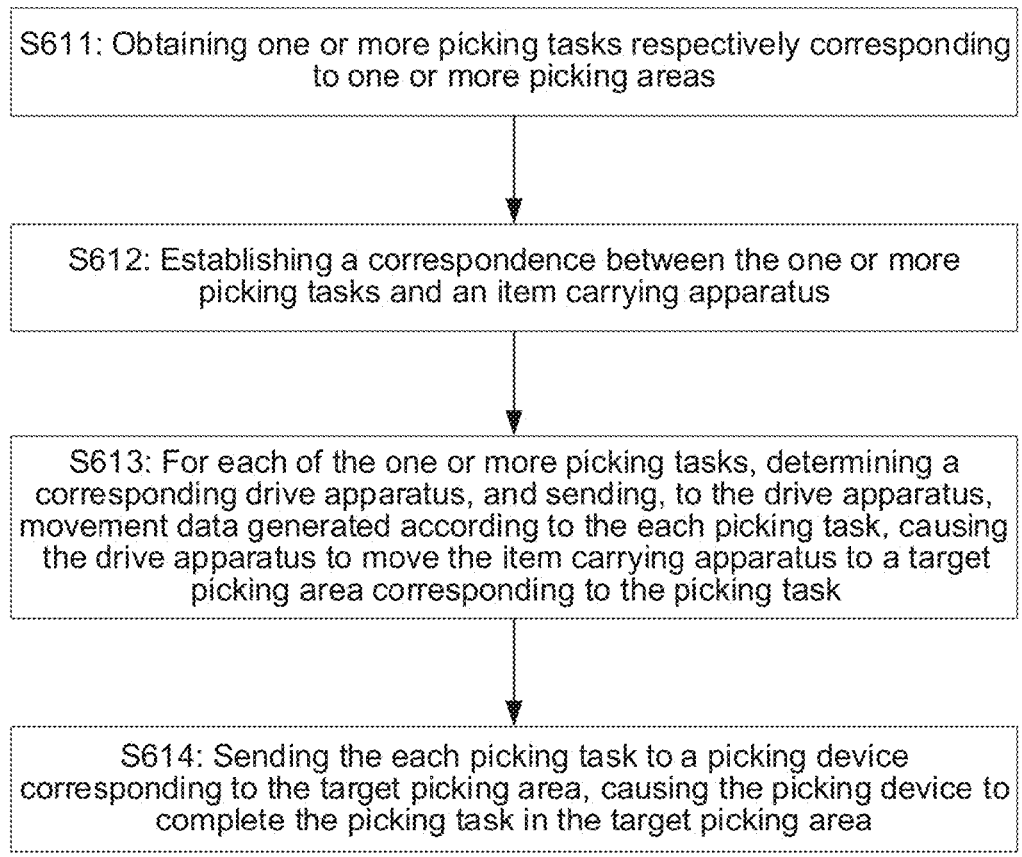
FIG. 6B is a flowchart of another item picking method, according to some embodiments of the present disclosure.

FIG. 6B illustrates a flowchart of an exemplary method 610, according to various embodiments of the present disclosure. The exemplary method 610 may be implemented by one or more components of the picking management device described above with reference to FIG. 6A. The operations of method 610 presented below are intended to be illustrative. Depending on the implementation, the example method 610 may include additional, fewer, or alternative steps performed in various orders or in parallel.

At block S611, one or more picking tasks respectively corresponding to one or more picking areas may be obtained. At block S612, a correspondence between the one or more picking tasks and an item carrying apparatus may be established. At block S613, for each of the one or more picking tasks, a corresponding drive apparatus may be determined, and movement data generated according to the each picking task may be sent to the drive apparatus, causing the drive apparatus to move the item carrying apparatus to a target picking area corresponding to the picking task. At block S614, for each of the one or more picking tasks, the each picking task may be sent to a picking device corresponding to the target picking area, causing the picking device to complete the picking task in the target picking area.

Figure 6C:
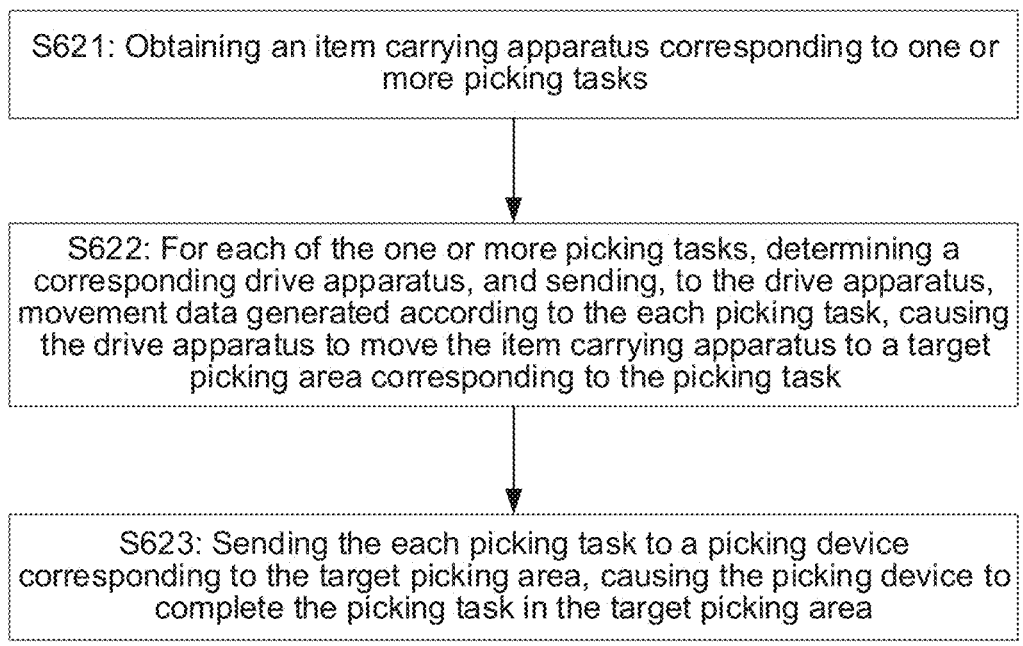
FIG. 6C is a flowchart of another item picking method, according to some embodiments of the present disclosure.

FIG. 6C illustrates a flowchart of an exemplary method 620, according to various embodiments of the present disclosure. The exemplary method 620 may be implemented by one or more components of the picking management device described above with reference to FIG. 6A. The operations of method 620 presented below are intended to be illustrative. Depending on the implementation, the example method 620 may include additional, fewer, or alternative steps performed in various orders or in parallel.

At block S621, an item carrying apparatus corresponding to one or more picking tasks may be obtained. At block S622, for each of the one or more picking tasks, a corresponding drive apparatus may be determined, and movement data generated according to the each picking task may be sent to the drive apparatus, causing the drive apparatus to move the item carrying apparatus to a target picking area corresponding to the picking task. At block S623, for each of the one or more picking tasks, the each picking task may be sent to a picking device corresponding to the target picking area, causing the picking device to complete the picking task in the target picking area. In some embodiments, the block S621 may comprise the block S611 and the block S612 described above.

In some embodiments, determining the corresponding drive apparatus for each of the one or more picking tasks may comprise: determining an arrangement order of the one or more picking tasks; and determining the corresponding drive apparatus for the each of the one or more picking tasks based on the arrangement order.

FIG. 7A shows the structure of a drive apparatus according to the present disclosure. The drive apparatus includes: a communication interface 701, a processor 702, and a traction module 703.

The communication interface 701 is configured to receive movement data sent by a picking management device, where the movement data includes a start point position and an end point position, the start point position represents a position of an item carrying apparatus, and the end point position represents a position of a picking area corresponding to a picking task corresponding to the item carrying apparatus.

The processor 702 is configured to send a move instruction to a traction module according to the movement data.

The traction module 703 is configured to move the item carrying apparatus according to the move instruction, causing the item carrying apparatus to be moved to the picking area. The traction module 703 may include a mechanical component having a traction function.

In an example, the movement data includes the start point position and the end point position; and the sending, by the processor, a move instruction to a traction module according to the movement data includes: obtaining a spatial layout of a storage space of the picking area, and planning a movement route from the start point position to the end point position according to the spatial layout; and sending the move instruction to the traction module according to the movement route.

In an example, the communication interface is further configured to: receive a picking task sent by the picking management device, and send the picking task to a picking device.

The present disclosure further provides an item carrying apparatus, including a communication interface and a carrying module.

The communication interface is configured to: receive a picking task sent by a picking management device; and after receiving a task obtaining request of a picking device in a picking area corresponding to a picking task, send the picking task to the picking device.

The carrying module is configured to carry an item picked by the picking device according to the picking task.

The carrying module may have a box body having an accommodating space.

In an example, multiple storage containers are disposed in the carrying module; and the communication interface is further configured to receive a storage container layout of the item carrying apparatus sent by the picking management device, where the storage container layout represents positions of the storage containers on the item carrying apparatus.

The item carrying apparatus further includes: a display, configured to display the storage container layout.

FIG. 7B illustrates a flowchart of an exemplary method 710, according to various embodiments of the present disclosure. The exemplary method 710 may be implemented by one or more components of the drive apparatus described above with reference to FIG. 7A. The operations of method 710 presented below are intended to be illustrative. Depending on the implementation, the example method 710 may include additional, fewer, or alternative steps performed in various orders or in parallel.

At block S711, movement data sent by a picking management device may be received, wherein the movement data comprises a start point position and an end point position, the start point position represents a position of an item carrying apparatus, and the end point position represents a position of a picking area corresponding to a picking task associated with the item carrying apparatus. At block S712, the item carrying apparatus may be moved according to the movement data to the picking area.

Figures 8A, 8B:
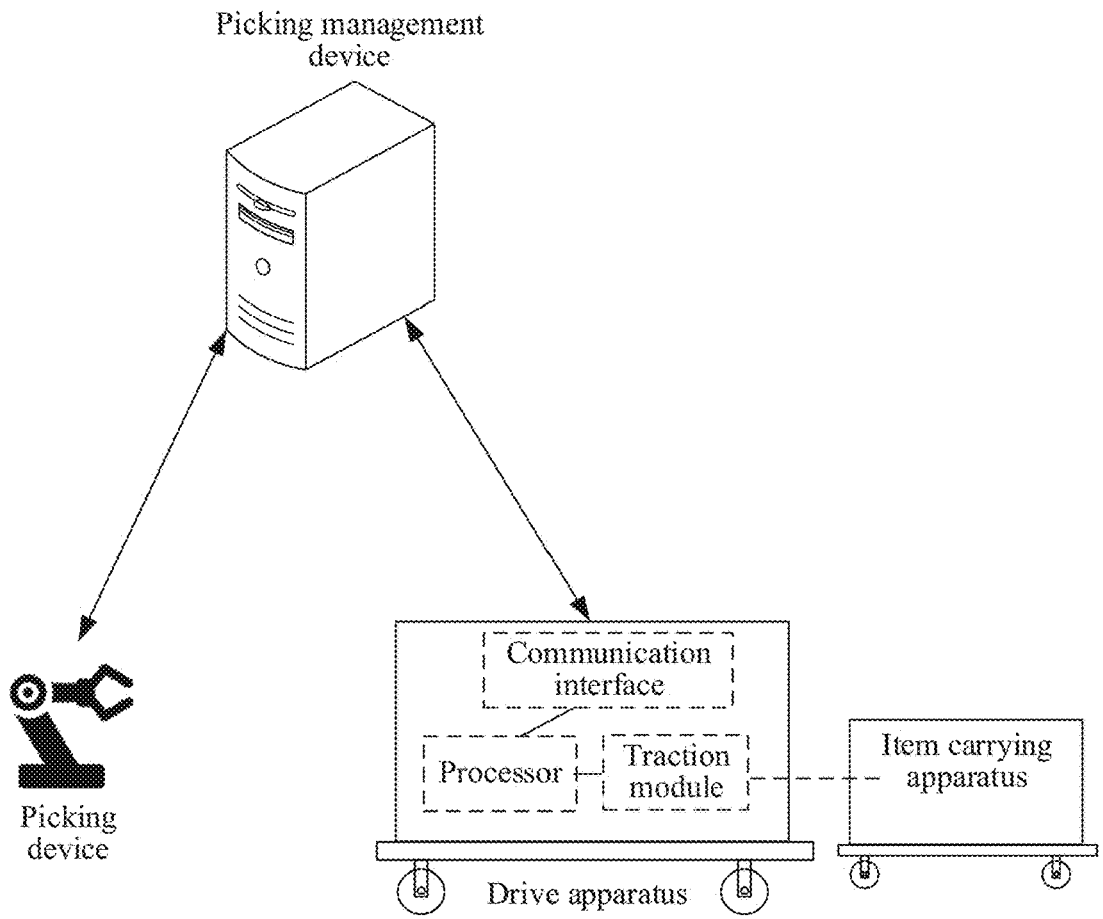
FIG. 8A is a schematic structural diagram of an item picking system according to some embodiments of the present disclosure.
FIG. 8B is a flowchart of another item picking method, according to some embodiments of the present disclosure.

FIG. 8A shows the structure of an item picking system according to the present disclosure. The item picking system includes: a picking management device, a drive apparatus, and a picking device.

The picking management device is configured to: obtain multiple picking tasks, where different picking tasks correspond to different picking areas; establish a correspondence between the multiple picking tasks and a same item carrying apparatus; determine a corresponding drive apparatus for a picking task of the multiple picking tasks; send, to the drive apparatus, movement data generated according to the picking task; and send the picking task to a picking device corresponding to a target picking area corresponding to the picking task.

The drive apparatus is configured to move the item carrying apparatus according to the movement data to the target picking area.

The picking device is configured to complete the picking task in the target picking area.

The present disclosure further provides an item picking apparatus, implementable on a picking management device, and the item picking apparatus including: a picking task obtaining module, a correspondence establishment module, and a picking task execution module.

The picking task obtaining module is configured to obtain multiple picking tasks, where different picking tasks correspond to different picking areas.

The correspondence establishment module is configured to establish a correspondence between the multiple picking tasks and the same item carrying apparatus.

The picking task execution module is configured to: determine a corresponding drive apparatus for a picking task of the multiple picking tasks, and send, to the drive apparatus, movement data generated according to the picking task, where the movement data is used by the drive apparatus to move the item carrying apparatus to a target picking area corresponding to the picking task; and send the picking task to a picking device corresponding to the target picking area, to instruct the picking device to complete the picking task in the target picking area.

The present disclosure further provides an item picking apparatus, implementable on a drive apparatus, and the item picking apparatus including: a movement data receiving module and a traction module.

The movement data receiving module is configured to receive movement data sent by a picking management device, where the movement data includes a start point position and an end point position, the start point position represents a position of an item carrying apparatus, and the end point position represents a position of a picking area corresponding to a picking task corresponding to the item carrying apparatus.

The traction module is configured to move the item carrying apparatus according to the movement data, causing the item carrying apparatus to be moved to the picking area.

The present disclosure further provides an item picking apparatus, implementable on an item carrying apparatus, and the item picking apparatus including: a picking task receiving module and a picking task sending module.

The picking task receiving module is configured to receive a picking task sent by a picking management device.

The picking task sending module is configured to: after receiving a task obtaining request of a picking device in a picking area corresponding to a picking task, send the picking task to the picking device.

FIG. 8B illustrates a flowchart of an exemplary method 810, according to various embodiments of the present disclosure. The exemplary method 810 may be implemented by one or more components of the item carrying apparatus described above with reference to FIG. 8A. The operations of method 810 presented below are intended to be illustrative. Depending on the implementation, the example method 810 may include additional, fewer, or alternative steps performed in various orders or in parallel.

At block S811, a picking task sent by a picking management device may be received. At block S812, a task obtaining request may be received from a picking device in a picking area corresponding to the picking task. At block S813, the picking task may be sent to the picking device.

The various modules described herein may be implemented as hardware and/or software. For example, the traction module may include a mechanical component having a traction function. For another example, the carrying module may be implemented as a box body having an accommodating space. With respect to the software aspect, the module may be associated with instructions stored in a non-transitory computer-readable storage medium (e.g., the memory 603). The memory may couple to a processor. When the instructions are executed by the processor, the processor may be caused to perform various methods described herein. For example, the carrying module and the traction module may additionally or alternatively be implemented as software programs for executing the corresponding steps.

The embodiments in this specification are all described in a progressive manner. Description of each of the embodiments focuses on differences from other embodiments, and reference may be made to each other for the same or similar parts among respective embodiments.

The relational terms herein such as first and second are used only to differentiate an entity or operation from another entity or operation, and do not require or imply any actual relationship or sequence between these entities or operations. Moreover, the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

The foregoing description of the disclosed embodiments enables a person skilled in the art to implement or use the present disclosure. It is apparent to a person skilled in the art to make various changes to these embodiments. The general concept defined in the specification may be implemented in other embodiments without departing from the spirit and scope of the present disclosure. Therefore, the present disclosure is not limited to these embodiments shown in the specification, and instead is to meet the widest range consistent with the principles and novel features disclosed in the specification.

What is claimed is:

1. An item picking method, comprising:
obtaining, by a picking management device, one or more picking tasks respectively corresponding to one or more picking areas;
determining, by the picking management device, an order of the one or more picking tasks based on a load state of each of the one or more picking areas and a completion progress of each of one or more item carrying apparatuses, wherein:
the load state of each picking area comprises a picking capability corresponding to the picking area and a quantity of item carrying apparatuses corresponding to the picking area, and
the completion progress of each item carrying apparatus comprises a ratio of a quantity of items that are placed in the item carrying apparatus to a quantity of items of a picking task associated with the item carrying apparatus;
determining, by the picking management device, a drive apparatus for each of the one or more picking tasks based on the order of the one or more picking tasks,
sending, by the picking management device to the drive apparatus, movement data generated according to the each picking task, causing the drive apparatus to move an item carrying apparatus to a target picking area corresponding to the picking task; and
sending, by the picking management device, the each picking task to a picking device corresponding to the target picking area, causing the picking device to complete the picking task in the target picking area.

2. The item picking method according to claim 1, further comprising:
establishing a correspondence between the one or more picking tasks and the item carrying apparatus.

3. The item picking method according to claim 1, wherein the obtaining one or more picking tasks comprises:
obtaining a picking list, wherein the picking list comprises a total picking task of picking items located in the one or more picking areas; and
dividing the total picking task into the one or more picking tasks according to the one or more picking areas.

4. The item picking method according to claim 1, wherein:
the determining an order of the one or more picking tasks comprises: determining that a duration of completing picking tasks corresponding to the determined order satisfies a preset duration condition; and
the load state of each picking area further comprises at least one of: a completion progress of one or more picking tasks corresponding to the picking area, and a duration needed to complete the one or more picking tasks.

5. The item picking method according to claim 1, wherein the determining a drive apparatus for each of the one or more picking tasks comprises:
determining the drive apparatus for the each of the one or more picking tasks according to at least one of a travel cost of the drive apparatus or a waiting cost of one or more item carrying apparatuses.

6. The item picking method according to claim 1, wherein the sending, to the drive apparatus, movement data generated according to the each picking task comprises:
using a position of the item carrying apparatus as a start point position, and using a position of the target picking area corresponding to the picking task as an end point position; and
generating the movement data according to the start point position and the end point position, and sending the movement data to the drive apparatus.

7. The item picking method according to claim 6, wherein the generating the movement data according to the start point position and the end point position comprises:
using the start point position and the end point position as the movement data.

8. The item picking method according to claim 6, wherein the generating the movement data according to the start point position and the end point position comprises:
planning a movement route from the start point position to the end point position according to a spatial layout of storage spaces of the one or more picking areas, and using the movement route as the movement data.

9. The item picking method according to claim 1, wherein the sending the each picking task to a picking device corresponding to the target picking area comprises:
sending the each picking task to the item carrying apparatus moved to the target picking area, wherein the each picking task is sent, after the item carrying apparatus is moved to the target picking area corresponding to the each picking task, by the item carrying apparatus to the picking device corresponding to the target picking area.

10. The item picking method according to claim 1, wherein the each picking task comprises: picking an item based on at least one of an identifier of the item or an identifier of the item carrying apparatus moved to the target picking area.

11. The item picking method according to claim 1, wherein one or more storage containers are disposed on the item carrying apparatus moved to the target picking area, and the each picking task comprises: picking an item based on at least one of an identifier of item, an identifier of the item carrying apparatus moved to the target picking area, or an identifier of at least one of the one or more storage containers.

12. The item picking method according to claim 11, further comprising:
sending a storage container layout of the item carrying apparatus to the item carrying apparatus moved to the target picking area or the picking device, wherein the storage container layout represents positions of the storage containers on the item carrying apparatus, and the storage container layout is displayed on the item carrying apparatus or the picking device correspondingly.

13. A picking management device, comprising:
a processor configured to:
obtain one or more picking tasks respectively corresponding to one or more picking areas;
determining an order of the one or more picking tasks based on a load state of each of the one or more picking areas and a completion progress of each of one or more item carrying apparatuses, wherein:
the load state of each picking area comprises a picking capability corresponding to the picking area and a quantity of item carrying apparatuses corresponding to the picking area, and the completion progress of each item carrying apparatus comprises a ratio of a quantity of items that are placed in the item carrying apparatus to a quantity of items of a picking task associated with the item carrying apparatus;

determine a drive apparatus for each of the one or more picking tasks based on the order of the one or more picking tasks; and generate movement data according to the each picking task; and a communication interface configured to:

send the movement data to the drive apparatus, wherein the movement data is used by the drive apparatus to move an item carrying apparatus to a target picking area corresponding to the each picking task; and send the each picking task to a picking device corresponding to the target picking area, to instruct the picking device to complete the picking task in the target picking area.

14. The picking management device according to claim 13, wherein to obtain the one or more picking tasks, the processor is configured to:

obtain a picking list, wherein the picking list comprises a total picking task of picking items located in the one or more picking areas; and divide the total picking task into the one or more picking tasks according to the one or more picking areas.

15. The picking management device according to claim 13, wherein to determine the order of the one or more picking tasks, the processor is configured to:

determine that a duration of completing picking tasks corresponding to the determined order satisfies a preset duration condition, wherein the load state of the each picking area further comprises at least one of: a completion progress of one or more picking tasks corresponding to the picking area, and a duration needed to complete the one or more picking tasks.

16. The picking management device according to claim 13, wherein to determine the drive apparatus for each of the one or more picking tasks, the processor is configured to:

determine the drive apparatus for the each of the one or more picking tasks according to at least one of a travel cost of the drive apparatus or a waiting cost of one or more item carrying apparatuses.

17. The picking management device according to claim 13, wherein to generate the movement data according to the each picking task, the processor is configured to:

use a position of the item carrying apparatus as a start point position, and use a position of the target picking area corresponding to the picking task as an end point position; and generate the movement data according to the start point position and the end point position.

18. The picking management device according to claim 17, wherein to generate the movement data according to the start point position and the end point position, the processor is configured to use the start point position and the end point position as the movement data.

19. The picking management device according to claim 17, wherein to generate the movement data according to the start point position and the end point position, the processor is configured to: plan a movement route from the start point position to the end point position according to a spatial layout of storage spaces of the one or more picking areas, and use the movement route as the movement data.

20. The picking management device according to claim 13, wherein to send the picking task to the picking device corresponding to the target picking area, the communication interface is configured to:

send the each picking task to the item carrying apparatus moved to the target picking area, wherein the each picking task is sent, after the item carrying apparatus is moved to the target picking area corresponding to the each picking task, by the item carrying apparatus to the picking device corresponding to the target picking area.

21. The picking management device according to claim 13, wherein the each picking task comprises: picking an item based on at least one of an identifier of the item or an identifier of the item carrying apparatus moved to the target picking area.

22. The picking management device according to claim 13, wherein one or more storage containers are disposed on the item carrying apparatus moved to the target picking area, and the each picking task comprises: picking an item based on at least one of an identifier of the item, an identifier of the item carrying apparatus moved to the target picking area, or an identifier of at least one of the one or more storage containers.

23. The picking management device according to claim 22, wherein:

the processor is further configured to obtain a storage container layout of the item carrying apparatus moved to the target picking area; and the communication interface is further configured to send the storage container layout of the item carrying apparatus to the item carrying apparatus or the picking device, wherein the storage container layout represents positions of the storage containers on the item carrying apparatus, and the storage container layout is displayed on the item carrying apparatus or the picking device correspondingly.

24. An item picking system, comprising:

a picking management device configured to: obtain one or more picking tasks respectively corresponding to one or more picking areas; determining an order of the one or more picking tasks based on a load state of each of the one or more picking areas and a completion progress of each of one or more item carrying apparatuses, wherein: the load state of each picking area comprises a picking capability corresponding to the picking area and a quantity of item carrying apparatuses corresponding to the picking area, and the completion progress of each item carrying apparatus comprises a ratio of a quantity of items that are placed in the item carrying apparatus to a quantity of items of a picking task associated with the item carrying apparatus; determine a drive apparatus for each of the one or more picking tasks based on the order of the one or more picking tasks; send, to the drive apparatus, movement data generated according to the each picking task; and send the each picking task to a picking device corresponding to a target picking area corresponding to the each picking task;

the drive apparatus configured to move an item carrying apparatus according to the movement data to the target picking area; and the picking device configured to complete the picking task in the target picking area.

* * * * *